United States Patent [19]

Marett

[11] 4,096,385
[45] Jun. 20, 1978

[54] CLAY CONTENT DETERMINATION BY NATURAL GAMMA RAY SPECTROMETRY

[75] Inventor: Graham Marett, Paris, France

[73] Assignee: Schlumberger Technology Corporation, New York, N.Y.

[21] Appl. No.: 768,132

[22] Filed: Feb. 14, 1977

[30] Foreign Application Priority Data

Feb. 25, 1976 United Kingdom ............... 7388/76

[51] Int. Cl.² ............................................. G01V 5/00
[52] U.S. Cl. ............................................... 250/262
[58] Field of Search ......................... 250/253, 261, 262

[56] References Cited

U.S. PATENT DOCUMENTS

| | | | |
|---|---|---|---|
| 3,336,476 | 8/1967 | Richardson | 250/262 R |
| 3,976,878 | 8/1976 | Chevalier et al. | 250/262 R |

Primary Examiner—Davis L. Willis

[57] ABSTRACT

In accordance with an illustrative embodiment of the present invention, a technique is provided for automatically processing measurements of the total natural gamma radioactivity and the thorium, uranium, potassium contents of formations surrounding a borehole to obtain a representation of the clay content of said formations in a zone of the borehole where the presence of one of said elements, called a disturbing element, is not related to clay. First, reference values of the total radioactivity and the thorium, uranium, potassium contents in the zone are determined. Then, at least two of these measurements are combined in accordance with a function determined from the reference values to produce a representation of the clay content of the formations corrected for the effect of the disturbing element.

30 Claims, 2 Drawing Figures

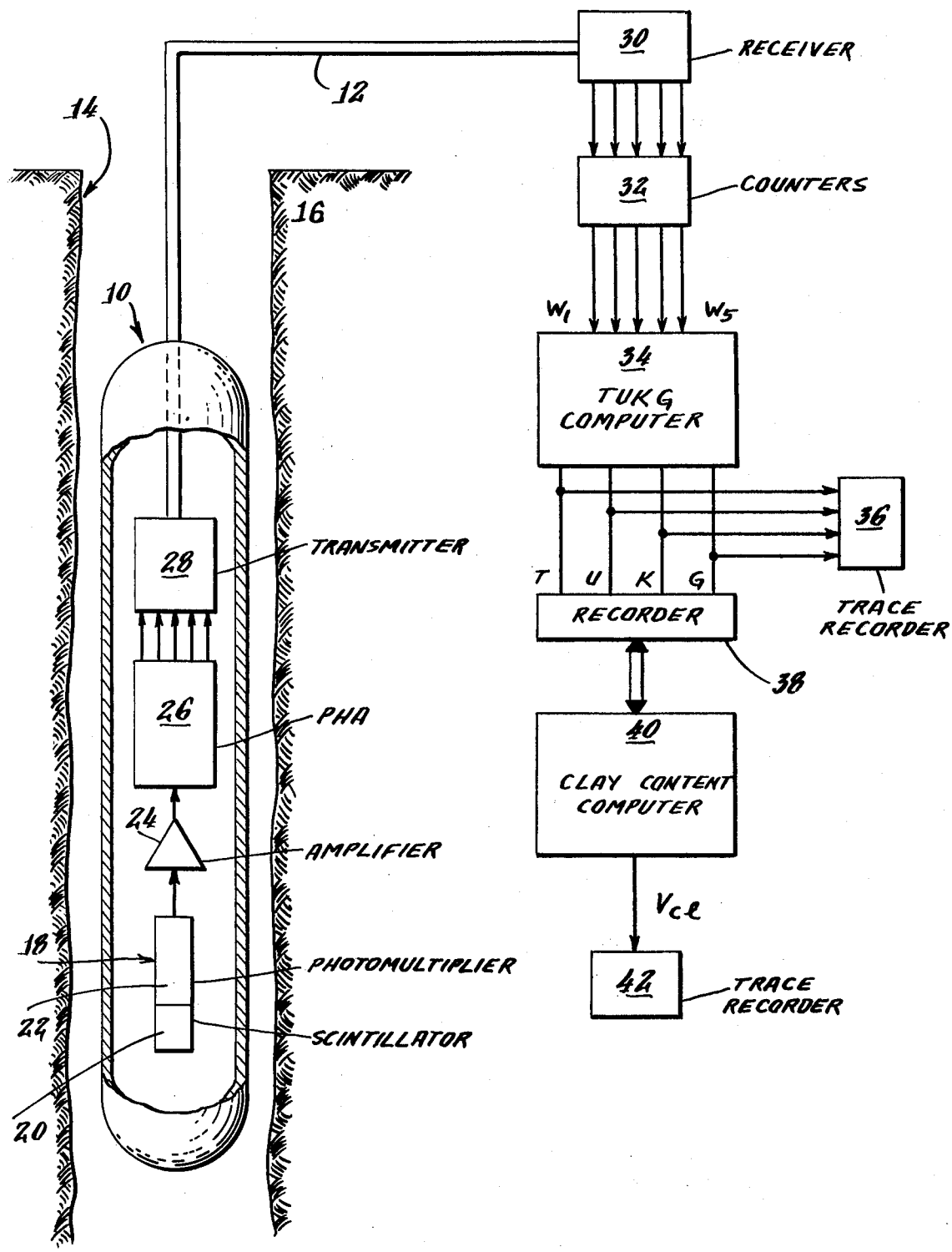

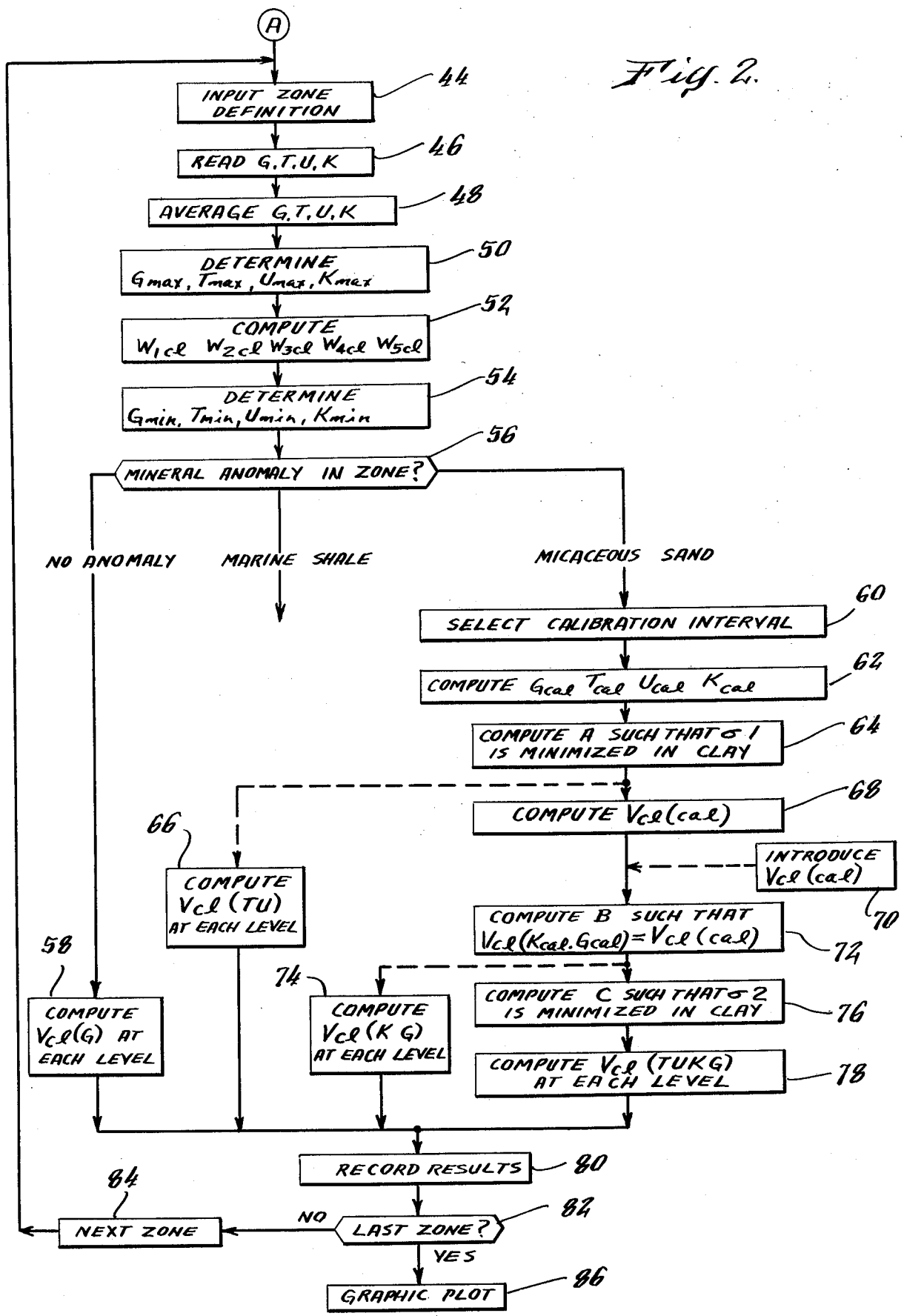

CLAY CONTENT DETERMINATION BY NATURAL GAMMA RAY SPECTROMETRY

BACKGROUND OF THE INVENTION

The present invention relates generally to techniques for automatically processing natural gamma radioactivity well logging data. More particularly, this invention relates to methods and apparatus for producing a representation of the clay content of formations surrounding a borehole from measurements of the total natural gamma radioactivity G, the content of the radioactive isotope potassium 40 (hereinafter called potassium or K), the content of the radioactive elements of the uranium family (hereinafter called uranium or U) and the content of the radioactive elements of the thorium family (hereinafter called thorium or T). T, U and K are responsible for nearly all gamma radiation encountered in the earth.

It is known that, since T, U and K are generally concentrated in clay, the natural gamma radioactivity of an earth formation is one of the most reliable clay indicators. The reliability of such indicator is, however, not as good as desired for the reason that several radioactive minerals are also encountered in sedimental areas which are not related to clay. This is the case in particular for the micaceous sands which contain potassium or for siderite that sometimes contains thorium. The presence of these radioactive minerals not related to clay is clearly indicated by the high value of the relative content (T/G or K/G ratio) of the radioactive element involved in the concerned layer compared to the values of the relative content of the same element in adjacent layers.

Another problem is due to the fact that a high value of the relative content of uranium (U/G ratio), i.e. a value significantly higher than those generally encountered in standard clay is often related, in sedimental areas, to the presence of organic materials. These materials have, throughout the course of the geological eras, favored the concentration of uranium in the formations. The marine shales which are rich in organic matters, notably phosphates and carbonates, have therefore an exceptionally high uranium content. It will be noted here that the expression "standard clay" covers clays whose relative TUK contents in the same sedimental bed are dispersed within a large, but relatively well known, range from which are excluded, for example, the relatively high uranium contents of the marine shales.

It is therefore a broad object of this invention to provide a technique for automatically processing natural gamma ray well logging data in order to determine a representation of the clay content of formations from the TUK contents when a disturbing radioactive element is present in some of these formations.

SUMMARY OF THE INVENTION

There is provided, in accordance with the invention, methods and apparatus for automatically processing measurements of the total natural gamma radioactivity and the contents of three natural radioactive elements of formations surrounding a borehole, to obtain a representation of the clay content of said formations in a zone of the borehole where the presence of one of said elements, called a disturbing element, is not related to clay. First, reference values of the above measurements in the zone are determined. Then, at least two of these measurements are combined in accordance with a function determined from the reference values to produce a representation of the clay content of the formations corrected for the effect of the disturbing element.

The function used may be a linear combination $H_1$ of the contents of the two radioactive elements other than the disturbing element. In that case, first and second reference values of these contents for the zone are determined respectively in substantially pure clay formations and in formations containing substantially no clay. These first and second reference values are preferably statistical maxima and statistical minima respectively of the contents of the two elements of interest in the zone. The function $H_1$ is obtained by choosing a linear combination of the two contents, which takes on a first and second predetermined value (for example 1 and 0) for the first and second reference values respectively, and by determining the coefficients to be assigned to said two contents so that the statistical variations of the linear combination are minimized. For that purpose, the standard deviation of the linear combination in pure clay formations is computed and the coefficients are determined so as to minimize the standard deviation.

The function used to obtain the clay content may also be a linear combination $H_2$ of the measurements of the total natural gamma radioactivity and the content of the disturbing element. In that case, first and second reference values of the two measurements are determined respectively in substantially pure clay formations and in formations containing substantially no clay. Third reference values of the two measurements are also determined within a calibration interval that contains the disturbing element. The function $H_2$ is obtained by choosing a linear combination of the two measurements, which takes on a first and second predetermined value for the first and second reference values respectively, and by determining coefficients to be assigned to said measurements so that the linear combination takes on an average value of the clay content in the calibration interval for the third reference values.

Finally, the function used to obtain the clay content may also be a linear combination $H_3$ of the functions $H_1$ and $H_2$. In that case, the function $H_3$ is obtained by choosing a linear combination of $H_1$ and $H_2$ and determining the coefficients to be assigned to these functions so that the statistical variations of the linear combination are minimized.

BRIEF DESCRIPTION OF THE DRAWINGS

For a better understanding of the present invention, together with further objects thereof, reference is had to the following description taken in connection with the accompanying drawings in which:

FIG. 1 is a schematic illustration of the invention; and

FIG. 2 illustrates one process which may be performed by the clay computer of FIG. 1.

DESCRIPTION OF THE PREFERRED EMBODIMENT

Referring now to FIG. 1, a logging sonde 10 is shown suspended by an armored cable 12 in a borehole 14 surrounded by earth formations 16. Within the sonde 10, a gamma ray detector 18, that includes a scintillator crystal 20 and a photomultiplier 22, responds to the natural radioactivity of the adjacent formation. Other radiation detectors, such as a solid-state germanium detector, also may be used.

The output of photomultiplier 22, after amplification by amplifier 24, is applied to a multichannel pulse high analyzer 26 which, in accordance with the teaching of U.S. Pat. No. 3,976,878, issued Aug. 24, 1976 to P. Chevalier et al., divides the amplitude spectrum of the photomultiplier output pulses into five contiguous windows. The three upper windows cover the detected gamma ray energy spectrum from a lower limit of about 1.1 MeV to an upper limit of approximately 3 MeV. These three windows are centered on the 2.62, 1.76 and 1.46 MeV highenergy peaks which are characteristic respectively of T, U and K. The two other windows cover the remaining low-energy portion of the spectrum below about 1.1 MeV, and each include peaks representative of one or more of the elements characterized by a peak in the three upper windows.

The particular cutoff values that define the five windows depend largely on the scintillator crystal used. When using, for example, a thallium activated sodium iodide scintillator, it has been found advantageous to select cutoff values to establish windows that include the five following energy ranges: 0.15 to 0.5 MeV, 0.5 to 1.1 MeV, 1.1 to 1.6 MeV, 1.6 to 2 MeV, 2 to 3 MeV.

The photomultiplier output pulses falling respectively within the five selected energy windows are produced on the five outputs of analyzer 26. The output pulses from analyzer 26 are transmitted over conductors in cable 12 by transmitter 28 and are received at the surface by receiver 30. Suitable techniques for performing that transmission function are well known, and therefore these devices need not be further described.

At the surface, the pulses from the five analyzer outputs are input to pulse counters 32 which apply to a "TUKG computer" 34 outputs representing, for each selected level of the borehole, the counting rates $w_1$, $w_2$, $w_3$, $w_4$ and $w_5$ of the detected gamma radiation falling within the five energy windows respectively.

Computer 34 is programmed to compute, for each level of interest, the proportions of the radioactive components TUK, by solving the following equations:

$$T = a_{11}w_1 + a_{12}w_2 + a_{13}w_3 + a_{14}w_4 + a_{15}w_5$$

$$U = a_{21}w_1 + a_{22}w_2 + a_{23}w_3 + a_{24}w_4 + a_{25}w_5 \quad (1)$$

$$K = a_{31}w_1 + a_{32}w_2 + a_{33}w_3 + a_{34}w_4 + a_{35}w_5$$

where $a_{11} \ldots a_{35}$ are weighting coefficients which have been determined from measurements in calibration blocks containing known amounts of thorium, uranium and potassium.

Computer 34 produces three signals representative of the computed TUK contents, expressed in ppm or percentage, and a fourth signal representative of the total natural gamma radioactivity G, expressed in API units or CPS, and computed by solving the equation:

$$G = n(w_1 + w_2 + w_3 + w_4 + w_5) \quad (2)$$

where $n$ is an empirically derived weighting coefficient. These four signals are applied to a trace recorder 36 which is conventionally depth synchronized as the sonde 10 is moved through the borehole and therefore generates logs of the TUK contents and the total radioactivity G of the earth formations traversed by the borehole.

A more detailed description of the determination of the TUK contents can be found in U.S. Pat. No. 3,976,878 already cited.

The TUKG measurements provided by computer 34 are also recorded, for each level of the borehole, on a magnetic tape recorder 38 or other suitable device for further processing by a "clay content" computer once the borehole has been divided into zones or intervals of different geologic characteristics. The computer processes these measurements in order to obtain, for each level of interest, a representation of the clay content of the formation. This representation is also recorded on magnetic tape recorder 38 for further processing with other logging data, but also for generating with the help of a trace recorder 42 a log of the clay content having a presentation similar to that of a natural gamma ray log.

The "clay content" computer may be either a general purpose digital computing apparatus properly programmed in a manner to perform the process described herein, or a special purpose computing apparatus composed of modules arranged to accomplish the described steps to perform the same process. The computer may be located at the well site, as represented, but it may also be at a remote location. In that case the measurements may be transmitted to the computer via a transmission system such as the system described in U.S. Pat. No. 3,599,156 issued Aug. 10, 1971.

A description of one process which may be performed at the well site, using conventional digital computing apparatus 40, is illustrated by blocks 44 to 86 of FIG. 2.

As already mentioned, the borehole is first divided into a number of zones, each of them containing formations with similar geologic characteristics in order to process separately measurements from different zones. The length of these zones may be as large as 500 m. The information which allows the identification of geologically different zones is normally determined by examination of the TUKG logs or other log data or provided by local geologic knowledge (presence of mica, for example).

Referring now to FIG. 2, beginning at point A, the measurements from each zone are processed as follows:

As shown in block 44, the information which is necessary to define the zone of interest is initially input. This information comprises, for example, the minimum and maximum depths of the zone and the type of mineral anomaly it may contain, such as micaceous sands or marine shales. The next step in the process may be as shown in block 46 where the TUKG measurements provided by magnetic tape recorder 38 are read level by level. Then, as shown in block 48, a reduction of the statistical variations is obtained by replacing the TUKG measurements at each level of the borehole by an average of these measurements on a predetermined interval. Typically, the average of the four measurements for each level is computed on a sevenlevel interval which is centered on the level of interest. The TUKG measurements being generally recorded every 15 cm. of the borehole, the average interval is 90 cm. long.

Next, reference values of the TUKG measurements in the zone under investigation are determined. More precisely, as shown in block 50, these reference values are the statistical maxima $T_{max}$, $U_{max}$, $K_{max}$, $G_{max}$ of the TUKG measurements. The statistical maximum $G_{max}$, for example, is defined not as the highest value of G for all the levels in the considered zone, but as a value which is higher than most of the values of G in the zone after elimination of some abnormally high values. Typically, the statistical maxima are obtained by eliminating the N highest values of G, N corresponding to 5% of the total number of levels in the zone. $T_{max}$, $U_{max}$, $K_{max}$, $G_{max}$ are the values of TUKG for the level of the highest remaining value of G. The four statistical maxima $T_{max}$, $U_{max}$, $K_{max}$, $G_{max}$ are retained as the reference values of TUKG in substantially pure clay.

The next step in the process is, as shown in block 52, the computation of the average clay counting rates $W_{1cl}$, $W_{2cl}$, $W_{3cl}$, $W_{4cl}$, $W_{5cl}$ which correspond to the statistical maxima $T_{max}$, $U_{max}$, $K_{max}$, $G_{max}$. As the five counting rates obtained at the level of $T_{max}$, $U_{max}$, $K_{max}$, $G_{max}$ are generally not directly available, these counting rates may be retrieved by solving the five following relationships:

$$W_{1cl} = b_{11}T_{max} + b_{12}U_{max} + b_{13}K_{max}$$

$$W_{2cl} = b_{21}T_{max} + b_{22}U_{max} + b_{23}K_{max}$$

$$W_{3cl} = b_{31}T_{max} + b_{32}U_{max} + b_{33}kmax$$

$$W_{4cl} = b_{41}T_{max} + b_{42}U_{max} + b_{43}K_{max}$$

$$W_{5cl} = b_{51}T_{max} + b_{52}U_{max} + b_{53}K_{max}$$

where $b_{11} \ldots b_{53}$ are weighting coefficients. As mentioned in U.S. Pat. No. 3,976,878, the matrix of the coefficients b is determined by measurements in calibration blocks. The matrix of the coefficients a used for the computation of the TUK contents is then derived as explained in said patent from the matrix of the coefficients b.

Then, as shown in block 54, the statistical minima $T_{min}$, $U_{min}$, $K_{min}$, $G_{min}$ of the TUKG measurements for the zone are determined. The technique is similar to that used for obtaining the four statistical maxima and comprises the elimination of the N lowest values of G for the zone (N corresponds to 5% of the number of levels in the zone) and the selection of the values of TUKG for the level of the lowest remaining value of G. The four statistical minima $T_{min}$, $U_{min}$, $K_{min}$, $G_{min}$ are retained as the reference values of TUKG in a substantially clean formation, i.e. without clay.

In the next step of the process, illustrated by block 56, a test is made to determine whether the zone contains a mineral anomaly, i.e. a disturbing radioactive element. This information has been input in the first step of the process (block 44).

If the zone contains no mineral anomaly, the total natural radioactivity G is used as a representation of the clay content in the zone. In such a case, as shown in block 58, the clay content $V_{cl}$ at each level is computed by the following equation:

$$V_{cl} = V_{cl(G)} = \frac{G - G_{min}}{G_{max} - G_{min}} \qquad (4)$$

If the zone contains a mineral anomaly, at least two of the TUKG measurements at each level are combined to obtain a representation of the clay content corrected for the effect of the disturbing element. The approach used in the micaceous sands will now be described in some detail. As a similar technique is applied to the marine shales, it will then be described more briefly.

In the case of micaceous sands, the presence of mica creates abnormally high potassium contents which are reflected by an increase in the total natural radioactivity G. The T and U contents reflect substantially the clay content, but their statistical variations are too great to enable the use of these measurements as they are.

The first step of the process used in a micaceous zone is, as shown in block 60, the selection of a calibration interval. The calibration interval is a statistically stable interval over a length of at least one meter approximately in which, for example, the K/T and/or K/U ratios are significantly higher than the $K_{max}/T_{max}$ and $K_{max}/U_{max}$ ratios respectively. Then, as shown in block 62, the average values $T_{cal}$, $U_{cal}$, $K_{cal}$, $G_{cal}$ of TUKG in the selected calibration interval are computed.

As already mentioned, the clay content in a micaceous zone is substantially reflected by the T and U contents. Therefore, clay contents in the zone $V_{cl(T)}$ and $V_{cl(U)}$ can be computed from the T and U measurements respectively according to the equations:

$$V_{cl(T)} = \frac{T - T_{min}}{T_{max} - T_{min}} \qquad (5)$$

$$V_{cl(U)} = \frac{U - U_{min}}{U_{max} - U_{min}} \qquad (6)$$

However, due to the low counting rates obtained from thorium and uranium, the statistical variations are very important, and the error on $V_{cl(T)}$ or $V_{cl(U)}$ is high. These statistical variations are minimized, in the process of the invention, by combining $V_{cl(T)}$ and $V_{cl(U)}$ in accordance with the following linear function:

$$H_1 = V_{cl(T \cdot U)} = A\,V_{cl(T)} + (1 - A)\,V_{cl(U)} \qquad (7)$$

It will be noted that $V_{cl(T \cdot U)}$ is a linear function of the T and U contents, which takes on the value 1 for $T = T_{max}$ and $U = U_{max}$, and the value 0 for $T = T_{min}$ and $U = U_{min}$.

The next step of the process is the determination of the coefficient A, and therefore the coefficient $(1 - A)$, used in equation 7. As shown in block 64, the standard deviation $\sigma_1$ for $V_{cl(T \cdot U)}$ due to the statistical variations in clay is computed. The value retained for A is that for which $\sigma_1$ is minimum.

The computation of $\sigma_1$ must be performed using the average clay counting rates $W_{1cl}$, $W_{2cl}$, $W_{3cl}$, $W_{4cl}$, $W_{5cl}$. Even if a sufficiently thick clay section is known, the counting rates for that section cannot be used to compute the standard deviation because the variations of these counting rates are due both to changes in the clay content and to statistical variations. By contrast, mathematical theory makes it possible to solve the problem when the average clay counting rates are known.

The counting rates w are aleatory variables which have a function of probability given by Poisson's Law. In that case, the standard deviation $\sigma$ is equal to the square root of the average value W. On the other hand, the different functions used in the steps of the process (T, U, K, G, $V_{cl(T)}$, $V_{cl(U)}$, $V_{cl(T \cdot U)}$) may be written in the general form:

$$F = L_1 w_1 + L_2 w_2 + L_3 w_3 + L_4 w_4 + L_5 w_5 \qquad (8)$$

where $L_1 \ldots L_5$ are constant coefficients and $w_1 \ldots w_5$ the counting rates in the five selected energy windows. The theorem of the addition of variances (the variance is the square of the standard deviation) teaches that the standard deviation for the function F is given by the equation:

$$\sigma^2 = L_1^2 W_1 + L_2^2 W_2 + L_3^2 W_3 + L_4^2 W_4 + L_5^2 W_5 \quad (9)$$

in which $W_1 \ldots W_5$ are the average values or the squares of the standard deviations.

Returning now more specifically to the step of the process shown in block 64, the coefficient A for the function $V_{cl(T \cdot U)}$ is computed as follows.

An arbitrary coefficient A, for example 0.5, is chosen, and the coefficients $L_1 \ldots L_5$ for $V_{cl(T \cdot U)}$ are computed. Since $$T = \sum_{i=1}^{5} a_{li} w_i$$

and
$$V_{cl(T)} = (T - T_{min}) / (T_{max} - T_{min}),$$

the coefficients of $V_{cl(T)}$ have the form $$a_{li} / (T_{max} - T_{min}) .$$

Similarly, the coefficients of $V_{cl(U)}$ are of the form $$a_{2i} / (U_{max} - U_{min}) .$$

Hence, the coefficients of $V_{cl(T \cdot U)}$ have the following form:

$$M_i = A a_{1i} / (T_{max} - T_{min}) + (1 - A) a_{2i} / (U_{max} - U_{min}). \quad (10)$$

Applying equation 9, the standard deviation $\sigma_1$ in clay is then computed by the following equation:

$$\sigma_1^2 = \sum_{i=1}^{5} (M_i)^2 W_{icl}. \quad (11)$$

The same computation is then repeated for a number of values of A in order to determine, by a conventional minimum search technique, the value of A for which $\sigma_1$ is minimum.

The function $V_{cl(T \cdot U)}$ is a representation of the clay content corrected for the effect of the disturbing radio-element potassium 40. As shown as an alternative in block 66, the next step of the process may be the computation of the clay content $V_{cl}$ for each level by the equation:

$$V_{cl} = V_{cl(T \cdot U)} = A V_{cl(T)} + (1 - A) V_{cl(U)} \quad (12)$$

where A has the value determined in the step of block 64. $V_{cl(T)}$ and $V_{cl(U)}$ are obtained by solving equations 5 and 6.

However, a better clay content representation may be obtained with smaller statistical variations. This approach includes the determination of a function for combining the K (disturbing element) and G measurements, and will now be described in detail.

The first step of this part of the process is, as indicated in block 68, the computation of an average value of the clay content $V_{cl(cal)}$ in the calibration interval (selected in the step of block 60) by computing $V_{cl(Tcal)}$ for $T_{cal}$ and $V_{cl(Ucal)}$ for $U_{cal}$ in accordance with the following relationships:

$$V_{cl(Tcal)} = \frac{T_{cal} - T_{min}}{T_{max} - T_{min}} \quad (13)$$

and
$$V_{cl(Ucal)} = \frac{U_{cal} - U_{min}}{U_{max} - U_{min}} . \quad (14)$$

$V_{cl(Tcal)}$ and $V_{cl(Ucal)}$ are then used to compute $V_{cl(cal)}$ by equation 7 that becomes:

$$V_{cl(cal)} = V_{cl(Tcal \cdot Ucal)} = A V_{cl(Tcal)} + (1 - A) V_{cl(Ucal)} \quad (15)$$

where A has the value determined in block 64.

Alternatively, as shown in block 70, a predetermined value of $V_{cl(cal)}$ can be used. This value may have been obtained, for example, during an earlier study of the calibration interval.

A function:

$$G_{cor} = G - BK \quad (16)$$

is then chosen, and the next step of the process is, as shown in block 72, the determination of the value of coefficient B for which $V_{cl(Kcal \cdot Gcal)}$, that is, the function:

$$H_2 = V_{cl(K \cdot G)} = \frac{(G - BK) - (G_{min} - BK_{min})}{(G_{max} - BK_{max}) - (G_{min} - BK_{min})} \quad (17)$$

with $G = G_{cal}$ and $K = K_{cal}$ takes the value $V_{cl(cal)}$.

It will be noted here that $V_{cl(K \cdot G)}$ is a linear function of K and G which takes on the value 1 for $K = K_{max}$ and $G = G_{max}$, and the value 0 for $K = K_{min}$ and $G = G_{min}$.

An equivalent approach would be to choose the function:

$$H_2' = V_{cl(K \cdot G)} = B' V_{cl(G)} + (1 - B') V_{cl(K)} \quad (18)$$

and determine the coefficient B' for which $V_{cl(K \cdot G)}$ takes on the value $V_{cl(cal)}$ in the calibration interval, i.e. with $$V_{cl(G)} = V_{cl(Gcal)} = \frac{G_{cal} - G_{min}}{G_{max} - G_{min}} \quad (19)$$

and
$$V_{cl(K)} = V_{cl(Kcal)} = \frac{K_{cal} - K_{min}}{K_{max} - K_{min}} \quad (20)$$

Once the coefficient B has been determined, the clay content $V_{cl} = V_{cl(K \cdot G)}$ may be computed according to equation 17 for each level of the zone, as shown in block 74. $V_{cl(K \cdot G)}$ is another representation of the clay content corrected for the effect of the disturbing element potassium 40. The statistical variations for $V_{cl(K \cdot G)}$ are often substantially lower than those for $V_{cl(T \cdot U)}$.

However, a still better clay content representation may be obtained by combining $V_{cl(T \cdot U)}$ (equation 7) and $V_{cl(K \cdot G)}$ (equation 17). For that purpose, the following function is used:

$$H_3 = V_{cl(T \cdot U \cdot K \cdot G)} = C V_{cl(T \cdot U)} + (1 - C) V_{cl(K \cdot G)}. \quad (21)$$

As shown in block 76, the next step of the process is the determination of the value of the coefficient C for which the standard deviation $\sigma_2$ of $V_{cl(T \cdot U \cdot K \cdot G)}$ in clay is minimum. The method used for computing $\sigma_1$ is then used for computing $\sigma_2$ from the five average counting rates in clay, $W_{1cl}, W_{2cl}, W_{3cl}, W_{4cl}, W_{5cl}$. Since $V_{cl(T \cdot U \cdot K \cdot G)}$ is a linear function of $T \cdot U \cdot K \cdot G$, it can be written in the form of equation 8. As the coefficients $M_i$ for $V_{cl(T \cdot U)}$ have already been computed (equation 10), it is then necessary to compute the coefficients for $V_{cl(K \cdot G)}$, which are of the form:

$$N_i = (n - Ba_{3i}) / (G_{max} - BK_{max} - G_{min} + BK_{min}) \quad (22)$$

The coefficients for $V_{cl(T \cdot U \cdot K \cdot G)}$ are then computed with an arbitrary value of C according to the equation:

$$P_i = C M_i + (1 - C) N_i \quad (23)$$

The standard deviation $\sigma_2$ is then obtained by solving the following equation:

$$\sigma_2^2 = \sum_{i=1}^{5} [C M_i + (1 - C) N_i]^2 W_{icl} \quad (24)$$

The computation of $P_i$ and $\sigma_2$ is then repeated for a number of values of C in order to determine the value of C for which $\sigma_2$ is minimum.

As shown in block 78, the next step is the computation of the clay content $V_{cl} = V_{cl(T \cdot U \cdot K \cdot G)}$ for each level of the zone according to equation 21, C having the value determined in the step of block 76. $V_{cl(T \cdot U \cdot K \cdot G)}$ is the final representation of the clay content of the formation derived from the natural gamma radioactivity thereof.

$V_{cl(T \cdot U \cdot K \cdot G)}$ — or any of the clay content representations computed in blocks 58, 66 and 74 — is recorded level by level on the magnetic tape 38 (FIG. 1), as indicated in block 80, for further processing with data coming from other logging instruments. Such processing may be as described in French Pat. No. 2.208.123.

In the next step of the process, illustrated by block 82, a test is made to determine whether the zone is the last zone to consider. If the answer is "No", the next zone has to be processed, as shown in block 84, and the next step is that shown in block 44 where the information necessary to define this new zone is input.

When all zones of the borehole have been processed, the answer to the test of block 82 becomes "Yes". At this time, as illustrated in block 86, the results stored in magnetic tape 38 are sent to trace recorder 42 in order to generate a log of the clay content of the formations surrounding the borehole, corrected for the effect of disturbing radioactive elements.

The approach used in the marine shales is substantially the same as that used in the micaceous zones. The disturbing element is then uranium, and the function $H_2$ determined in the step of block 72 is now a linear combination $V_{cl(U \cdot G)}$ of the U and G measurements. Therefore, this function is of the form:

$$H_2 = V_{cl(U \cdot G)} = \frac{(G - BU) - (G_{min} - BU_{min})}{(G_{max} - BU_{max}) - (G_{min} - BU_{min})} \quad (25)$$

However, a difference exists for the steps of blocks 64 and 68, as $V_{cl(T)}$ does not give satisfactory results in the case of marine shales. It is preferred not to compute the function $H_1 = V_{cl(T \cdot K)}$ that combines the measurements which are not influenced by the disturbing element U. $V_{cl(cal)}$ is then computed, in the step of block 68, according to the following equation:

$$V_{cl(cal)} = V_{cl(Kcal)} = \frac{K_{cal} - K_{min}}{K_{max} - K_{min}} \quad (26)$$

In the step of block 76, $V_{cl(K)}$ and $V_{cl(U \cdot G)}$ are combined linearly in accordance with the relationship:

$$H_3 = V_{cl(U \cdot K \cdot G)} = C V_{cl(K)} + (1 - C) V_{cl(U \cdot G)} \quad (27)$$

The final clay content representation $V_{cl}$ at each level is given by the combination $V_{cl(U \cdot K \cdot G)}$ of the U·K·G measurements.

Although the invention has been described with reference to specific embodiments thereof, many other variations and modifications of the invention will be apparent to those skilled in the art without departing from the spirit and scope of the invention.

I claim:

1. A method for automatically processing measurements of the total natural gamma radioactivity and the contents of three natural radioactive elements of a formation surrounding a borehole to obtain a representation of the clay content of said formation in a zone of the borehole where the presence of one of said elements, called a disturbing element, is not related to clay, comprising the steps of:
    determining reference values of said measurements in said zone; and
    combining at least two of said measurements in accordance with a function determined from said reference values to produce a representation of the clay content of the formation corrected for the effect of said disturbing element.

2. The method of claim 1, wherein said combining step includes combining the measurements of the contents of the two radioactive elements other than the disturbing element.

3. The method of claim 2, wherein said step of determining reference values comprises the determination of first and second reference values of the contents of said two radioactive elements for the zone, respectively in substantially pure clay formations and in formations containing substantially no clay.

4. The method of claim 3, wherein said first and second reference values are respectively statistical maxima and statistical minima of the contents of each of said two radioactive elements in said zone.

5. The method of claim 3, wherein the determination of said function comprises:
    forming a linear combination of the contents of said two radioactive elements which takes on a first and second predetermined value for said first and second reference values respectively; and
    determining coefficients to be assigned to said two contents so that the statistical variations of said linear combination are minimized.

6. The method of claim 5, wherein the step of determining said coefficients includes:
    computing the standard deviation of said linear combination in substantially pure clay formations; and
    determining the value of said coefficients for which said standard deviation is minimum.

7. The method of claim 1, wherein said combining step includes combining the measurements of the total natural gamma radioactivity and the content of the disturbing element.

8. The method of claim 7, wherein said step of determining reference values comprises:
    the determination of first and second reference values of the total natural gamma radioactivity and the content of said disturbing element for the zone, respectively in substantially pure clay formations and in formations containing substantially no clay; and
    the determination of third reference values of the total natural gamma radioactivity and the content of said disturbing element for the zone within a calibration interval that contains the disturbing element.

9. The method of claim 8, wherein:

said first and second reference values are respectively statistical maxima and minima of the total natural gamma radioactivity and the content of the disturbing element in said zone; and said third reference values are average values of the total natural gamma radioactivity and the content of the disturbing element in said calibration interval.

10. The method of claim 8, wherein the determination of said function comprises:

forming a linear combination of the total natural gamma radioactivity and the content of said disturbing element which takes on a first and second predetermined value for said first and second reference values respectively; and determining coefficients to be assigned to the total natural gamma radioactivity and the content of the disturbing element so that said linear combination takes on an average value of the clay content within the calibration interval for said third reference values.

11. The method of claim 10, wherein said average value is obtained by combining the contents of the two radioactive elements other than the disturbing element in said calibration interval in accordance with a linear function determined from said first and second reference values.

12. The method of claim 11, wherein the determination of said linear function includes:

forming a linear combination of the contents of said two radioactive elements which takes on a first and second predetermined value for said first and second reference values respectively; and determining coefficients to be assigned to said two contents so that the statistical variations of said linear combination are minimized.

13. The method of claim 10, wherein said average value is determined from the content of one of the elements other than the disturbing element in said calibration interval.

14. The method of claim 1, wherein said combining step includes combining, in accordance with a given function, a first function of at least the content of one of the two radioactive elements other than the disturbing element, determined from said reference values, and a second function of the total natural gamma radioactivity and the content of said disturbing element, determined from said reference values.

15. The method of claim 14, wherein said step of determining reference values comprises:

the determination of first and second reference values of the total natural gamma radioactivity and the contents of the three radioactive elements for the zone, respectively in substantially pure clay formations and in formations containing substantially no clay; and the determination of third reference values of the total natural gamma radioactivity and the contents of the three radioactive elements for the zone within a calibration interval that contains the disturbing element.

16. The method of claim 15, wherein:

said first and second reference values are respectively statistical maxima and statistical minima of the total natural gamma radioactivity and the contents of the three radioactive elements for the zone; and said third reference values are average values of the total natural gamma radioactivity and the contents of the three radioactive elements in said calibration interval.

17. The method of claim 15, wherein the determination of said first function comprises:

forming a first linear combination of the contents of said two radioactive elements other than the disturbing element which takes on a first and second predetermined value for the first and second reference values respectively; and determining coefficients to be assigned to the contents of said two elements so that the statistical variations of said first linear combination are minimized.

18. The method of claim 17, wherein the step for determining said coefficients includes:

computing the standard deviation of said first linear combination in substantially pure clay formations; and determining the value of said coefficients for which said standard deviation is minimum.

19. The method of claim 15, wherein the determination of said second function comprises:

forming a linear combination of the total natural gamma radioactivity and the content of said disturbing element which takes on a first and second predetermined value for the first and second reference values respectively; and determining coefficients to be assigned to the total natural gamma radioactivity and the content of the disturbing element so that said second linear combination takes on an average value of the clay content within the calibration interval for said third reference values.

20. The method of claim 19, wherein said average value is obtained by:

forming a linear combination of the contents of the two radioactive elements other than the disturbing element which takes on a first and second predetermined value for said first and second reference values respectively; and determining coefficients to be assigned to said two contents so that the statistical variations of said linear combination are minimized.

21. The method of claim 14, wherein the determination of said given function includes:

forming a linear function of said first and second functions which takes on a first and second predetermined value for said first and second reference values respectively; and determining coefficients to be assigned to said first and second functions so that the statistical variations of said given function are minimized.

22. A method for automatically processing natural gamma ray well logging data to obtain a representation of the clay content of a formation surrounding a borehole in a zone where the presence of a radioactive element, called a disturbing element, is not related to clay, comprising the steps of:

deriving from said well logging data measurements of the total natural gamma radioactivity and the contents of three natural radioactive elements for said formation;

determining reference values of said measurements in said zone; and combining at least two of said measurements in accordance with a function determined from said reference values to produce a representation of the clay content of the formation corrected for the effect of the disturbing element.

23. The method of claim 22, wherein said combining step includes combining in accordance with a linear function the contents of the two radioactive elements other than the disturbing element.

24. The method of claim 22, wherein said combining step includes combining in accordance with a linear function the total natural gamma radioactivity and the content of said disturbing element.

25. The method of claim 22, wherein said combining step includes combining in accordance with a linear function a first function of at least the content of one of the two radioactive elements other than the disturbing element determined from said reference values, and a second function of the total natural gamma radioactivity and the content of said disturbing element, also determined from said reference values.

26. An apparatus for automatically processing measurements of the total natural gamma radioactivity and the contents of three natural radioactive elements of a formation surrounding a borehole to obtain a representation of the clay content of said formation in a zone where the presence of one of said elements, called a disturbing element, is not related to clay, comprising:
means for determining reference values of said measurements in said zone; and
means for combining at least two of said measurements in accordance with a function determined from said reference values to produce a representation of the clay content of the formation corrected for the effect of the disturbing element.

27. The apparatus of claim 26, wherein said combining means includes means for combining in accordance with a linear function the contents of the two radioactive elements other than the disturbing element.

28. The apparatus of claim 26, wherein said combining means includes means for combining in accordance with a linear function the total natural gamma radioactivity and the content of said disturbing element.

29. The apparatus of claim 26, wherein said combining means includes means for combining in accordance with a linear function a function of at least the content of one of the two radioactive elements other than the disturbing element and a second function of the total natural gamma radioactivity and the content of said disturbing element.

30. An apparatus for automatically processing natural gamma ray well logging data to obtain a representation of the clay content of a formation surrounding a borehole in a zone where the presence of a radioactive element, called a disturbing element, is not related to clay, comprising:
means for deriving from said well logging data measurements of the total natural gamma radioactivity and the contents of three natural radioactive elements for said formation;
means for determining reference values of said measurements in said zone; and
means for combining at least two of said measurements in accordance with a function determined from said reference values to produce a representation of the clay content of the formation corrected for the effect of the disturbing element.

* * * * *